(12) United States Patent
Chapla

(10) Patent No.: US 10,214,883 B2
(45) Date of Patent: Feb. 26, 2019

(54) SILLCOCK FOR ROBUST RE-INSTALLATION

(71) Applicant: Gene Chapla, Pittsburgh, PA (US)

(72) Inventor: Gene Chapla, Pittsburgh, PA (US)

(*) Notice: Subject to any disclaimer, the term of this patent is extended or adjusted under 35 U.S.C. 154(b) by 280 days.

(21) Appl. No.: 15/163,894

(22) Filed: May 25, 2016

(65) Prior Publication Data

US 2017/0342689 A1 Nov. 30, 2017
US 2018/0209125 A9 Jul. 26, 2018

Related U.S. Application Data

(60) Provisional application No. 62/167,368, filed on May 28, 2015.

(51) Int. Cl.
*E03B 9/02* (2006.01)
*F16L 5/00* (2006.01)

(52) U.S. Cl.
CPC ............... *E03B 9/025* (2013.01); *F16L 5/00* (2013.01)

(58) Field of Classification Search
CPC ........ E03B 9/025; F16L 5/00; Y10T 137/698; Y10T 137/6977; E03C 1/021; E03C 1/042; E03C 2201/50
See application file for complete search history.

(56) References Cited

U.S. PATENT DOCUMENTS

| | | | | |
|---|---|---|---|---|
| 536,801 | A * | 4/1895 | Gaghan | E03C 1/042 137/295 |
| 6,378,910 | B1 * | 4/2002 | Maiman | F16L 5/10 137/359 |
| 8,272,396 | B2 * | 9/2012 | Brienza | E03C 1/021 137/360 |
| 2002/0167164 | A1 * | 11/2002 | Thomas | E03C 1/042 285/46 |
| 2007/0039660 | A1 * | 2/2007 | Hickman | E03B 7/10 139/360 |
| 2013/0025707 | A1 * | 1/2013 | McPhail | F16L 5/02 137/360 |

* cited by examiner

*Primary Examiner* — Ryan A Reis
(74) *Attorney, Agent, or Firm* — Leslie Virany

(57) ABSTRACT

The present invention pertains to problems associated with the installation of new sillcocks in existing masonry or other building materials. A sillcock, or 'hose bib' having broader base plate is provided to prevent collapse especially in older or damaged building materials and to minimize damage to new installations.

19 Claims, 4 Drawing Sheets

SILLCOCK FOR ROBUST RE-INSTALLATION

BACKGROUND

The present invention pertains to the field of outdoor water faucets, variously known to practitioners of the art as 'hose bibs' or sillcocks.

A problem exists in the prior art with respect to the installation of new sillcocks in existing masonry or other building materials. Various attempts have been made to address this problem. For example, U.S. Pat. No. 8,272,396 (Brienza) and U.S. Pat. No. 7,055,863 (Commeville) propose solutions which, though inspired and well-meaning, fail to provide a universal solution to the problem, or only do so while requiring significant expense and effort.

In particular '396 Brienza proposes a somewhat bulky auxiliary structure poorly anchored to the main pipe and suffering also from the deficiency that tabs, which cannot be guaranteed to be sturdy, are the only means of creating a separation between the pipe aperture and bolt apertures. Furthermore, this costly (in terms of strength) solution imposes a limit on the diameter of any washer that might be used to distribute pressure from tightened bolts, as a larger washer will abut against the main cylindrical wall.

'863 Commeville appears to provide an enclosure for aesthetic purposes, but without addressing issues of hole separation.

A need remains for an effective, efficient remedy to the prior art.

SUMMARY

The present invention provides solutions to the above-mentioned problems. A sillcock is provided, of characteristics pertaining to at least one or more of material, dimensions and design, which exhibit benefits over the prior art.

For purposes of the present application, the terms 'hose bib' or sillcock may be applied synonymously.

DETAILED DESCRIPTION

Figure 1:
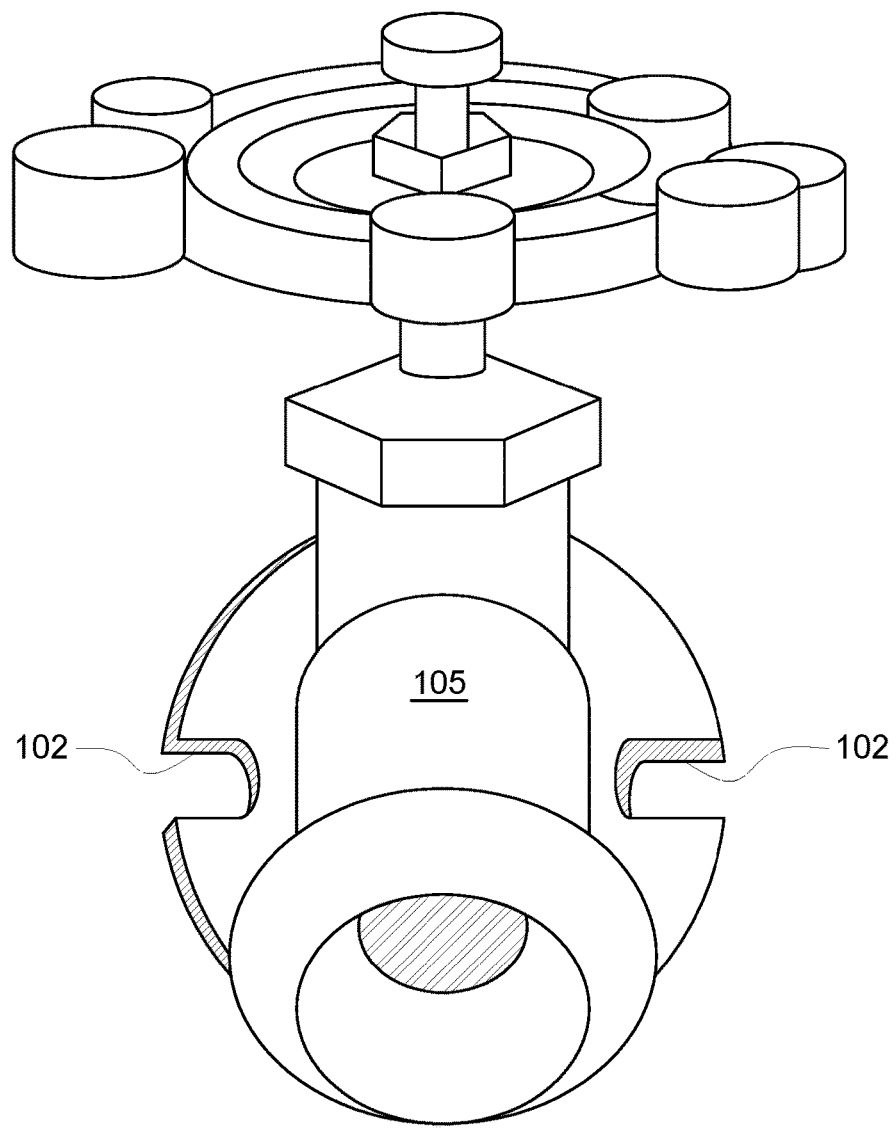
FIG. 1 The typical hose bib of the prior art is shown.

The typical hose bib of the prior art is shown in FIG. 1. A relatively large hole must be made in the mounting wall, intended to receive the pipe or conduit (typically metal) which conducts water from a supply source, usually within the building structure to the faucet 105, the faucet generally being an integral part of the sillcock. The structure may be commercial or residential in nature and the sillcock is typically installed through an outer wall, though variations can exist.

Installation may be a complex matter and, as will become more apparent below, is typically performed by an experienced professional craftsman such as a plumber.

As the usual case is for installation to involve the outer wall of a structure, damage to the wall presents a serious problem. Outer walls provide not only privacy and barriers to wind, heat, (and/or cold) noise and so on, but often may have security implications as well. Furthermore outer walls provide structural support, which may at times become critical, such as during storms, sub-zero weather and the like.

Typical location of a sillcock may well be determined by factors unrelated to the foregoing structural and practical considerations. Thus installation might exacerbate these problems, for example requiring boring and/or drilling into mounting material which cannot be guaranteed to be accomplished without structural implications, making a repeat or imperfect job more than a mild inconvenience.

The present invention in particular corrects the problematic confluence of a hole intended for the passage of the water pipe with holes needed to provide anchoring and aligning with screw- or bolt-holes 102. As shown in FIG. 1, the prior art typically minimizes the sillcock's requirement for material by providing anchor holes 102 close to the faucet 105.

Figure 2:
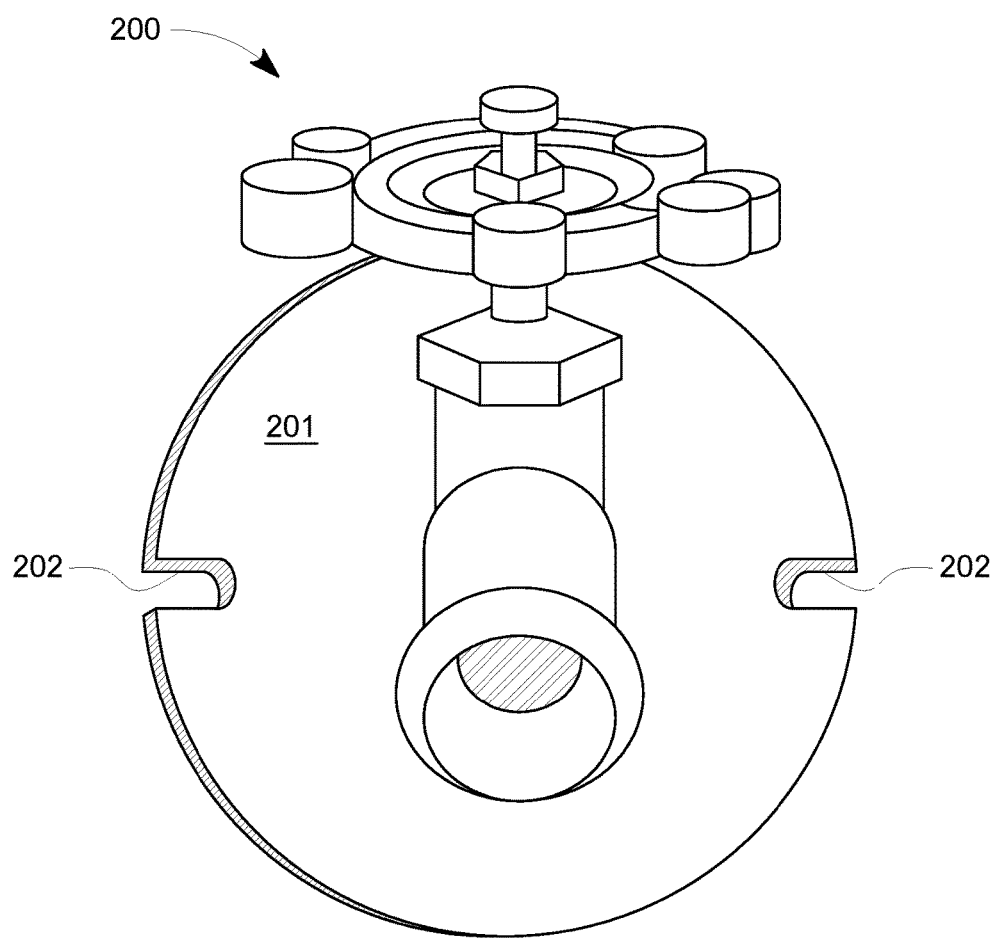
FIG. 2 The present invention, drawn substantially to scale
FIG. 3 A preferred embodiment of the invention as shown in FIG. 2
FIG. 4 An embodiment of the invention as shown in FIG. 2, adapted for specific purposes such as prior wall damage in identifiable areas.

As shown in FIG. 2, the sillcock 200 of the present invention present invention, as a fundamental improvement, expressly provides an extended base-plate 201, thus allowing a much larger separation between the various holes in the sillcock, which improvement correspondingly allows a much larger separation between the various holes to be made (or used, in the case of existing holes) in the mounting wall, whether masonry, wood, concrete or other material. The diameter of the base plate 201 is approximately 3.5 inches.

In the case of a sillcock reinstalled where one has previously been, the present invention almost completely eliminates the usual problems that may arise by progressive weakening of mounting material. Especially in cases where multiple installations, which may have required repeated boring to accommodate sillcocks manufactured by different entities and thus not being expected to align their respective hole needs, the present invention far surpasses the prior art in minimizing possible further compromising of the mounting structure.

Figure 3:
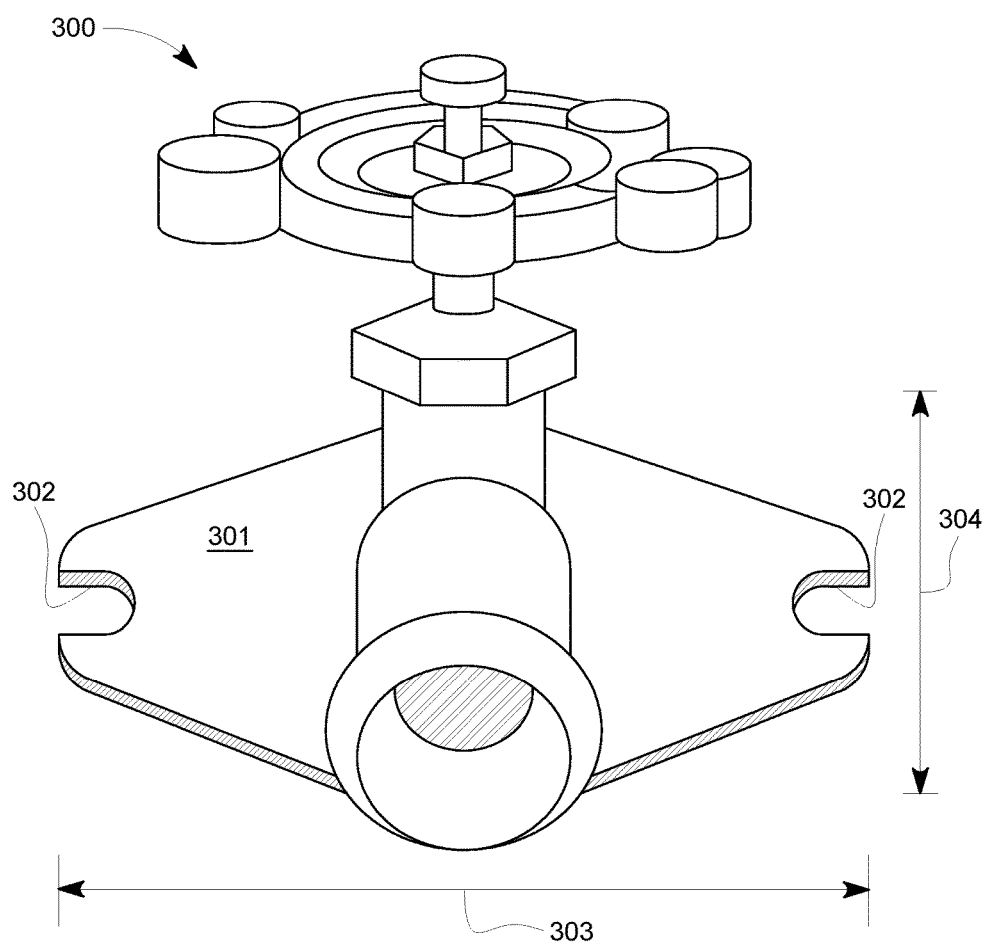

As further shown in FIG. 3, in a preferred embodiment of the present invention, the long dimension 303 remains approximately 3.5 inches as in the former case, but the height 304 is reduced to about 2 inches, giving the base plate 301 a rounded, oval or extended diamond-like shape. This shape allows for a less intrusive form and, depending on the choice of plate thickness, less use of metal.

Figure 4:
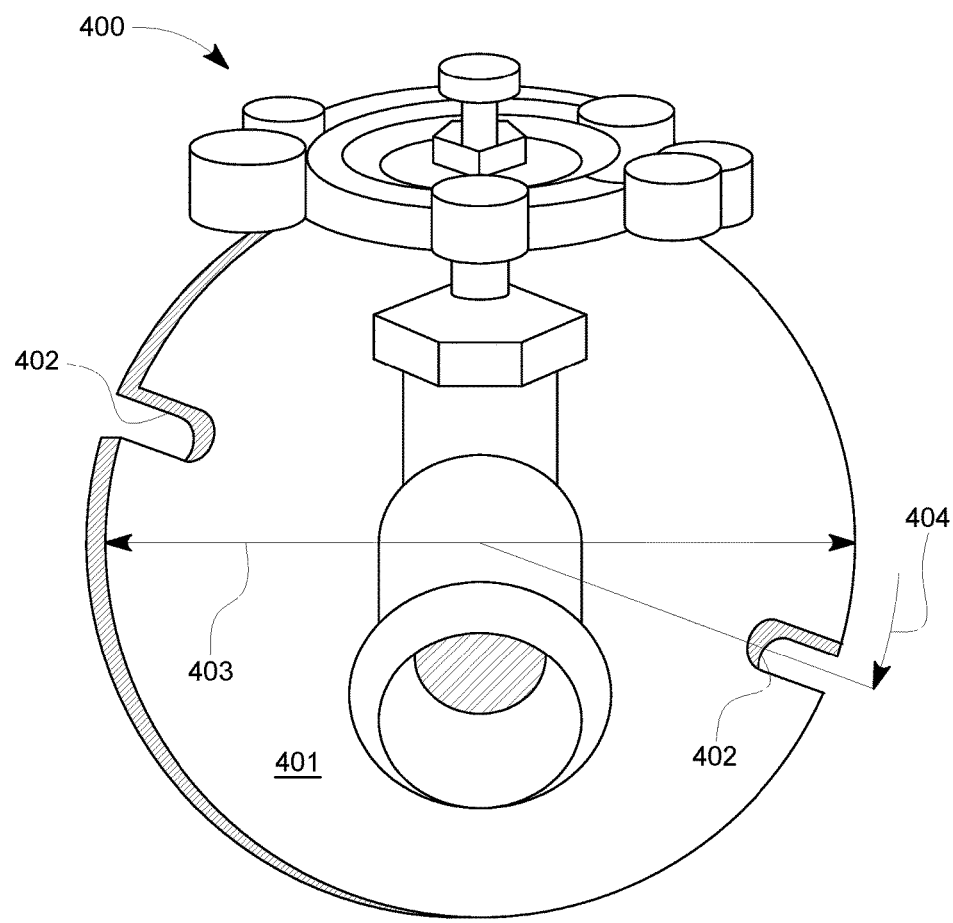

Other embodiments of the present invention focus on variations which further seek to provide for a less risky and trouble free installation. Embodiments provide, among other benefits, for choices in hole location which may be more advantageous for specific installation jobs such as, for example, a sillcock 400 with bolt anchor holes 402 having an angular offset 404 with respect to a diameter 403 drawn through the main pipe-hole as shown in FIG. 4. Note that the diameter shown 403 pertains to a round plate, though in some offset embodiments the base plate does not extend to its maximum diameter at angles apart from the actual anchoring locations of the bolts. Such an embodiment is particularly useful in its ability to mount onto least-damaged material, in the case where a pre-existing sillcock, with holes as shown in any of the prior figures, incurred damage to the mounting surface. The angular offset may be in either direction.

As a surprising result, the larger surface area of the plate 201, 301, 401, as compared with the prior art, permits, in an embodiment for a somewhat thinner material to be used without risk of failing to provide adequate material for secure anchoring of the bolts in holes 202, 302, 402. The thinner material allows for a degree of enhanced flexibility of the plate, which allows for improved ability to conform to the surface of the mounting material (typically masonry). An attendant benefit is that a secure fit will not be prevented even if the mounting wall surface happens to be uneven. Washers (not shown) may be employed if necessary, in ways well known in the art, to ensure that any excessive torque applied to the bolts does not risk damaging the plate.

As a further surprising result, the aforementioned reduced thickness, in an embodiment, of the plate, permits easier re-drilling of new anchor holes for bolts without the need for specialized tools. Re-drilling might be beneficial in cases where a first choice for hole placement is precluded by prior damage to the mounting wall.

As yet another surprising result of the present invention, the increased separation between the pipe hole and the anchor holes allows for the use of an expanded range of washers or spacers, both in materials and size, These washers or spacers may be chosen in such a way as to exert an increased compressive force over a larger surface area, a feature which may especially be of value in the case of mounting material which is weak or has been made weak by repeated installations, even when masonry holes made to match elements 202, 302, 402 have collapsed together into the pipe hole.

Those experienced in the field of this invention should, based on the detailed descriptions of the objectives and new methods, be able to understand the logical possible variations. They will be able to adopt appropriate materials, dimensions and geometries depending on the various applications and needs of different installations, not specifically shown in this application, but within the general goals and objectives of this invention. Specifically, the word 'bolt' is understood to include other types of fasteners known in the art, which may or may not be threaded, such as screws, rivets or the like. The word 'pipe' is used to designate a fluid conduit which is typically, though not exclusively, liquid, especially water, but may be considered for purposes of this invention to include other substances, including gases.

Examples disclosed are intended to be limiting only as reflected in the appended claims.

I claim:

1. A sillcock for installation of a faucet on a building outer wall comprising
   a base plate traversed through a central hole by a fitted pipe and having a smooth planar surface of area at least five times a cross-sectional area of said pipe
   said base plate consisting of two bolt or screw holes, respectively corresponding to holes drilled in said wall for at least two mounting bolts or screws, wherein said base plate is integral with the faucet and wherein:
   the separation between said holes is at least three times an outer diameter of said pipe
   said smooth planar surface exerts, substantially throughout the area of said base plate, a uniformly-distributed compressive force against said wall.

2. The sillcock of claim 1 wherein said planar surface further comprises;
   a first planar diameter, in the plane of said surface area and along a line immediately proximal the centers of said two bolt or screw holes, in excess of two and a quarter inches
   a metal composition capable of flexing to conform to unevenness in said wall.

3. The sillcock of claim 2 wherein said two bolt or screw holes are spaced substantially evenly around the perimeter of said base plate.

4. The sillcock of claim 3 wherein;
   said metal composition permits secure attachment to said wall
   said unevenness comprises a displacement of a thickness of a standard spacer washer, or approximately a thirty-second of an inch at said two bolt or screw holes, without causing appreciable damage, to said wall and wherein a thickness of said base plate is selected to enhance said secure attachment.

5. The sillcock of claim 2 further comprising a second planar diameter, along a vertical line in said plane dropped from the center of said faucet.

6. The sillcock of claim 5 wherein said second planar diameter is reduced to approximately 2 inches, giving the base plate a rounded, oval or extended diamond-like shape.

7. The sillcock of claim 5 wherein said first planar diameter comprises an offset from perpendicular by an amount between 5 and 85 degrees.

8. The sillcock of claim 5 wherein said first planar diameter is greater than two and a half inches.

9. The sillcock of claim 8 wherein said first planar diameter is greater than three inches.

10. The sillcock of claim 9 wherein said first planar diameter is greater than three and a quarter inches.

11. The sillcock of claim 7 wherein said offset is clockwise, by an amount between 10 and 80 degrees.

12. The sillcock of claim 7 wherein said offset is counterclockwise, by an amount between 10 and 80 degrees.

13. The sillcock of claim 11 wherein said offset is by an amount between 30 and 60 degrees.

14. The sillcock of claim 12 wherein said offset is by an amount between 30 and 60 degrees.

15. The sillcock of claim 7 wherein said offset is by an amount of approximately 45 degrees.

16. The sillcock of claim 6 wherein said first planar diameter is greater than two and a half inches.

17. The sillcock of claim 16 wherein said first planar diameter is greater than two and three quarters inches.

18. The sillcock of claim 17 wherein said first planar diameter is greater than three inches.

19. The sillcock of claim 18 wherein said first planar diameter is greater than three and a quarter inches.

* * * * *